July 31, 1962
L. C. WASSON
3,047,156
REINFORCED PLASTIC POROUS TUBULAR STRUCTURE
AND METHOD OF MANUFACTURE
Filed May 1, 1959
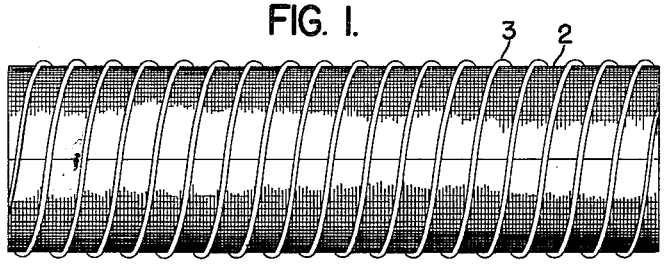
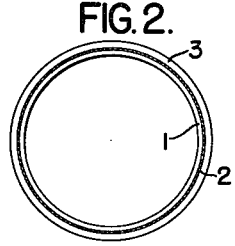
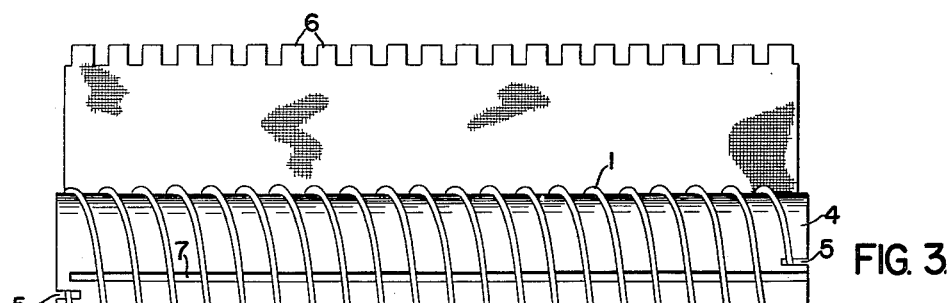
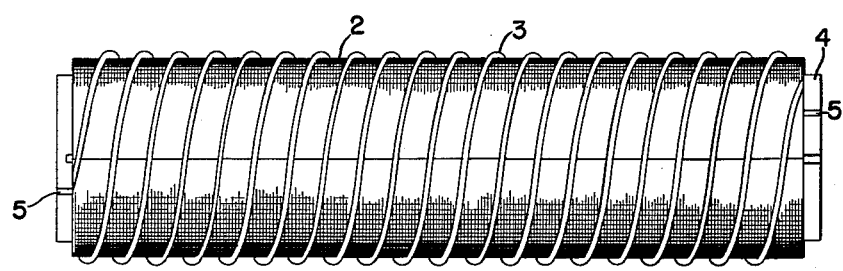
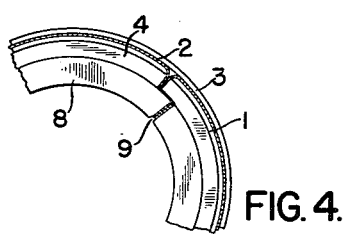
INVENTOR.
LOERWOOD G. WASSON
BY *Andrus + Starke*
Attorneys United States Patent Office 3,047,156
Patented July 31, 1962

3,047,156
REINFORCED PLASTIC POROUS TUBULAR STRUCTURE AND METHOD OF MANUFACTURE
Loerwood C. Wasson, Wauwatosa, Wis., assignor to A. O. Smith Corporation, Milwaukee, Wis., a corporation of New York
Filed May 1, 1959, Ser. No. 810,375
8 Claims. (Cl. 210—497)

This invention relates to tubular reinforced plastic structures, and more particularly to a porous, fiber-reinforced tubular article and to a method of making the same.

Porous tubing is used extensively for purification and filtration of liquids. A porous filter is an essential part of a water softening unit which utilizes a brine tank containing a saline solution and a sand bed as one of its components. Filters which have metallic or paper components will not give satisfactory service when used in a concentrated saline solution. Paper component filters tend to decompose after a short period of service, and those with metallic parts corrode very easily. A filter is needed which will withstand heavy external pressures, and is corrosion resistant, and it is also important that such a filter be made of materials which are readily available and simple to manufacture.

This invention makes it possible to use ordinary plastic screening of a wide range of sizes to make a good, serviceable filter, which is capable of withstanding heavy pressures and is corrosion resistant, even when used in a saline solution. Plastic screening is generally not suitable for use in filtration systems under heavy pressure, unless reinforced. It is non-corrosive, however, which makes it very desirable for use in brine solutions, or other corrosive media, which shorten the useful life of filters comprised of metallic parts. Plastic screening is available with various sized interstices and proper selection of the size of interstitial openings will permit exact control of the porosity of the filter to be made by this method.

The porous tubular structure of the invention is adaptable for use as a non-corrosive filter which will withstand heavy external pressure, in the range of 200–400 p.s.i., or better. The tubular article comprises an inner layer of spaced, helically wound fibers, an intermediate layer of plastic screening, and an outer layer of spaced, helically wound fibers. The fiber layers and the plastic screening are bonded together as an integral structure by a binder such as a thermosetting resin.

It is an object of this invention to provide a corrosion resistant, light weight, porous tubular article, which has a given filtering capacity.

Another object of this invention is to utilize plastic screening to fabricate filters adapted to withstand heavy pressure. The plastic screening is reinforced by an inner layer of fibers, giving internal rigidity and strength and the choice of plastic screening size produces a filter of controlled porosity. The porous tubular article can be fabricated in a substantially continuous winding operation which reduces the cost of manufacture.

Other objects and advantages of this invention will appear in the course of the following description.

The drawings illustrate the best mode presently contemplated for carrying out the invention.

In the drawing:

FIGURE 1 is a side elevation showing the completed tubular structure;

FIG. 2 is a transverse section of the completed tubular structure;

FIG. 3 is a side view showing the inner layer of fibers wound on the mandrel, and the plastic screening in position to be attached to the mandrel;

FIG. 4 is an enlarged, fragmentary transverse section of the partially completed structure mounted on the mandrel, showing the inner fiber strand, the screening wrapped tightly around the mandrel, and anchored thereto, and the outer fiber strand; and FIG. 5 is a side elevation showing the completed structure partially removed from the mandrel.

The drawings illustrate a porous, reinforced, plastic tubular article which comprises an inner, helically wound fiber strand 1, supporting an intermediate layer of screening 2. An outer fiber strand 3 is helically wound around the screening 2, and the strands 1 and 3 and screening 2 are bonded together by an adhesive such as a thermosetting resin.

The fiber strands 1 and 3 are wound generally with the opposite helix angle and the adjacent turns or convolutions of each strand are spaced apart a distance equal to or greater than the maximum dimension of the openings in the plastic screening 2.

The fiber strands 1 and 3 may be formed of mineral fibers such as glass, asbestos, synthetic fibers such as nylon or Orlon or vegetable or animal fibers. The important characteristic of each fiber strand is that it be flexible to enable winding, and that its coiled strength be sufficient to give the necessary support to the plastic screening.

The screening 2 has generally uniform, evenly spaced openings throughout its surface. It may be formed of such materials as fiber glass, Saran, nylon, asbestos or corrosion resistant metal such as copper, bronze or aluminum. The screening surface serves as the filtering surface of the finished article.

The adhesive employed to bond the layers together is a resin, such as vinyl acetate. Other conventional thermosetting resins such as polyesters, epoxides, ureas, melamines and the like may be employed as the bonding agent.

The function of the fiber strand 1 is to give internal rigidity to the plastic screening 2. The screening 2 determines the porosity, and the outer fiber strand 3 contains the structure.

The article is formed by initially winding the inner fiber strand 1 about a mandrel 4, in a generally helical pattern, with the turns or convolutions being uniformly spaced at a distance at least equal to the greatest dimension of the interstices in the screening 2. The free ends of the fiber strand 1 are secured at each end of the mandrel 4 within an anchor slot 5, provided at each end of the mandrel 4, as shown in FIG. 3. The anchor slot 5 is a V-shaped cut in the end of the mandrel 4. The free ends of the fiber strands 1 and 3 are pushed into the anchor slots 5 and held there by friction.

A series of spaced projecting fingers 6 are provided on the opposite edges of the screening 2, with the width of the projecting fingers 6 being sufficiently small to fit between the turns or convolutions of the fiber strand 1, and project into the longitudinal cam slot 7 of the mandrel 4, as illustrated in FIG. 3. The inside wall of the mandrel 4 is provided with cam 8, mounted to rotate within the mandrel. The cam 8 extends longitudinally the entire length of the mandrel 4, and is provided with a longitudinal slot 9. The cam 8 and the longitudinal slot 9 are open at the same end of the mandrel 4 to facilitate removal of the completed product. The projecting fingers 6 of the screening 2 are received within the slot 9 and rotation of the cam 8 pinches the projecting fingers 6 between the longitudinal edge of the cam 8 and the longitudinal edge of the cam slot 7 on the mandrel 4. Only one set of projecting fingers 6 need be pinched by the cam 8 when the fiber strand 3 is employed, as the fiber strand 3 will hold the screening 2 in place if one edge of projecting fingers 6 is anchored. FIG. 4 illustrates the gripping action of the rotating inner cam 8, and the screening 2 positioned in relation to the fiber strand 1.

After the plastic screening 2 is secured to the mandrel 4, the outer fiber strand 3 is helically wound around the plastic screening 2 with a helix angle generally opposite to the inner fiber strand 1, as illustrated in FIG. 5.

The tubular article is then held by external pressure pads, not shown, removed from the end of the mandrel 4 and immersed in a bath of a thermosetting resin. The completed article is then removed from the resin bath and heated to cure the resin and bond the inner fiber strand 1, the plastic screening 2 and the outer fiber strand 3 together. After the resin has thoroughly set, the pressure pads are released. The finished product is a rigid, porous tubular article as shown in FIGURE 1.

It is also contemplated that the porous plastic tubular article may be impregnated with a resin while mounted on the mandrel 4. Instead of dipping, the resin may be applied to the completed article by a traveling brush or spray nozzle, or manually by means of a brush or a swab. Or, the fiber strand 1, the plastic screening 2, and the outer fiber strand 3 may be impregnated separately with the resin prior to the steps of assembly on the mandrel.

This method of manufacture produces a rigid, plastic, reinforced, tubular structure of controlled porosity, which is non-corrosive and can be used as a filter in brine tanks or the like. This method utilizes plastic screening with uniform porosity so that the porosity of the final, completed article can be controlled by the choice of a specific mesh size of the plastic screening.

While the above description is directed to the use of helically wound fibrous strands 1 and 3 as the reinforcement, it is contemplated that spaced, metal or fiber reinforced rings can be employed in place of the helically wound strands.

Various modes of carrying out the invention are contemplated as being within the scope of the following claims particularly pointing out and distinctly claiming the subject matter which is regarded as the invention.

I claim:

1. A non-corrosive, porous, plastic, reinforced tubular structure, comprising a screening material disposed in a tubular shape and having a plurality of openings of substantially uniform size, a fibrous reinforcing strand disposed in a generally helical pattern and disposed contiguous to said screening, the adjacent turns of the strand in the helical pattern being spaced apart uniformly to expose the screening, and a cured thermosetting resin disposed between the strand and the screening extending continuously throughout each turn of said strand to bond the strand and screening as a rigid, composite integral self-supporting structure.

2. A non-corrosive, porous, plastic, reinforced tubular structure, which comprises a screening material of substantially uniform porosity disposed in a tubular shape, a helically wound fiber strand disposed on the inside of the screening with the adjacent turns of the fiber strand spaced to expose the screening, a containing strand disposed in a generally helical pattern around said screening, the adjacent turns of the containing strand being spaced apart to expose the screening, and a cured thermosetting resin disposed as a coating on said strand and on said screening and serving to continuously bond each turn of the strand to the screening and to provide a rigid composite integral, self-supporting structure.

3. In a method of manufacture of a porous tubular structure, the steps comprising winding a fiber strand upon a mandrel in a generally circumferential pattern with the adjacent turns of the fiber strand being spaced apart, wrapping a sheet of screening around the fiber strand, holding the longitudinal edges of the screening along the entire length thereof against movement, winding a second fiber strand about the screening in a generally circumferential pattern with the adjacent turns of the second fiber strand being spaced, impregnating the fiber strands and screening with an uncured thermosetting resin, curing the resin to bind the fiber strands and the screening together, and removing the structure from the mandrel, said screening providing the porous structure with a controlled porosity.

4. A method of manufacture of a tubular structure to be employed as a filter, the steps comprising winding a fiber strand in a substantially helical pattern, maintaining the adjacent turns of the strand in a uniformly spaced relation on the mandrel, circumferentially wrapping a sheet of plastic screening around the helically wound fiber strand, locking the longitudinal edges of said sheet along the entire length thereof to prevent unwrapping of said sheet, winding a second fiber strand in a substantially helical pattern about the screening maintaining the turns of the second fiber stand in a uniformly spaced relation on the mandrel, impregnating the strands and screening with an uncured thermosetting resin, and curing the resin to bind the fiber strands and the screening together, said plastic screening providing a porous filtering element of controlled porosity.

5. In a method of manufacture of a tubular structure to be employed as a filter, the steps comprising winding a fiber strand impregnated with an uncured thermosetting resin on a mandrel in a series of generally circumferential turns, wrapping the fiber strand with a plastic screening impregnated with an uncured thermosetting resin, winding a second fiber strand impregnated with an uncured thermosetting resin around the plastic screening in a second series of generally circumferential turns, said turns of both said first and second series being spaced from adjacent turns to expose the screening between the adjacent turns, curing the resin to form an integral structure, and then removing the structure from the mandrel.

6. The structure of claim 1 in which the spacing between the adjacent turns of said strand is greater than the maximum dimension of said openings in said screening.

7. A non-corrosive, porous, plastic tubular structure comprising a helically disposed inner reinforcing member with adjacent turns of said inner member being uniformly spaced apart, a sheet of screening disposed around said inner member in a generally cylindrical shape with the longitudinal edges of said sheet having a series of laterally projecting fingers disposed between adjacent turns of said inner member to maintain spacing of said turns during fabrication, an outer reinforcing member disposed in a helical pattern around the screening with the adjacent turns of said outer member being spaced apart to expose said screening, and a cured resin adhesive disposed as a coating on said inner and outer members and on said screening and serving to continuously bond each turn of said inner and outer members to the screening and to provide a rigid composite integral, self-supporting structure.

8. A method of manufacture of a self-supporting reinforced plastic porous tubular filter, the steps comprising, winding a fiber strand in a substantially helical pattern with the adjacent turns of the strand being maintained in uniformly spaced relation, cutting a plurality of spaced laterally extending fingers in opposite edges of a sheet of screening, circumferentially wrapping the sheet around the wound fiber strand, inserting the fingers between adjacent turns of the wound strand to maintain the uniform spacing of said turns, impregnating said fiber strand and said sheet of screening with an uncured thermosetting resin, and curing the resin to permanently set the resin to bind the fiber strand and the sheet of screening together in an integral, self-supporting tubular filter.

References Cited in the file of this patent

UNITED STATES PATENTS

| | | |
|---|---|---|
| 911,682 | Scheunert | Feb. 9, 1909 |
| 1,294,018 | Zahm | Feb. 11, 1919 |
| 1,906,565 | Frentzel | May 2, 1933 |
| 2,067,439 | Dooley | Jan. 12, 1937 |
| 2,297,729 | Thomas | Oct. 6, 1942 |
| 2,333,618 | Strauss | Nov. 2, 1943 |
| 2,512,797 | Harvout | June 27, 1950 |
| 2,551,175 | Smith | May 1, 1951 |
| 2,569,243 | Kovacs | Sept. 25, 1951 |
| 2,611,718 | Steinman | Sept. 23, 1952 |
| 2,768,751 | Booth | Oct. 30, 1956 |